(12) United States Patent
Chapman et al.

(10) Patent No.: US 7,227,277 B2
(45) Date of Patent: Jun. 5, 2007

(54) MULTIPLE INPUT DC-DC POWER CONVERTER

(75) Inventors: Patrick L. Chapman, Champaign, IL (US); Bryan G. Dobbs, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 207 days.

(21) Appl. No.: 10/696,772

(22) Filed: Oct. 29, 2003

(65) Prior Publication Data

US 2005/0093373 A1 May 5, 2005

(51) Int. Cl.
*H02J 1/10* (2006.01)
(52) U.S. Cl. ........................................ 307/43
(58) Field of Classification Search ................ 307/18, 307/19, 52, 58, 43, 82
See application file for complete search history.

(56) References Cited

U.S. PATENT DOCUMENTS

| | | | | |
|---|---|---|---|---|
| 5,436,818 A | * | 7/1995 | Barthold | 363/21.12 |
| 5,710,699 A | * | 1/1998 | King et al. | 363/132 |
| 6,894,461 B1 | * | 5/2005 | Hack et al. | 323/205 |

OTHER PUBLICATIONS

H. Matsuo, K. Kobayashi, Y. Sekine, M. Asano, L. Wenzhog, "Novel Solar Cell Power Supply System Using the Multiple-Input DC-DC Converter," 20th International Telecommunications Energy Conference, INTELEC, 1998, pp. 797-802.

H. Matsuo, T. Shigemizu, F. Kurokawa, N. Watanabe, "Characteristics of the Multiple-Input DC-DC Converter," 24th Annual IEEE Power Electronics Specialists Conference, 1993, pp. 115-120.

A. DiNapoli, F. Crescimbini, L. Solero, F. Caricchi, F.G. Capponi, "Multiple-Input DC-DC Power Converter for Power-Flow Management in Hybrid Vehicles," Conference Record of the 37th Annual IEEE Industry Applications Conference, 2002, pp. 1578-1585.

F. Caricchi, F. Crescimbini, O. Honorati, A.D. Napoli, E. Santini, "Testing of a new DC/DC Converter Topology for Integrated Wind-Photovoltaic Generating Systems," Fifth European Conference on Power Electronics and Applications, vol. 8, 13-16, 1993, 13-16, pp. 83-88.

B.G. Dobbs, P.L. Chapman, "A Multiple-Input DC-DC Converter," submitted for review to IEEE Power Electronics Letters, Oct. 31, 2002.

* cited by examiner

*Primary Examiner*—Robert L. Deberadinis
(74) *Attorney, Agent, or Firm*—Greer, Burns & Crain, Ltd.

(57) ABSTRACT

Apparatuses and methods for converting a plurality of dc input voltages from a plurality of voltage sources to at least one dc output voltage. An apparatus embodiment includes a plurality of voltage inputs. A respective current-conducting-bidirectional-voltage-blocking switch is in an electrical path from each of the voltage inputs. A magnetically inductive device is in an electrical path from each of the current-conducting-bidirectional-voltage-blocking switches. A voltage output is in an electrical path from the magnetically inductive device.

34 Claims, 9 Drawing Sheets

MULTIPLE INPUT DC-DC POWER CONVERTER

This invention was made with Government support under Contract Number ECS0134208 awarded by the National Science Foundation (NSF). The Government has certain rights in the invention.

FIELD OF THE INVENTION

The invention is in the field of electrical power conversion.

BACKGROUND OF THE INVENTION

Most electrical systems are supplied by one kind of energy source, e.g., batteries, wind energy, solar energy, or utility energy. Certain special cases are supplied by two sources, such as uninterruptible power supplies. Electrical systems would beneficially be supplied by energy sources of all kinds. Renewable sources are of particular interest, as resources are further distributed about the terrestrial power grid. In islanded power systems, interfacing of multiple sources allows for improved reliability, flexibility, and use of preferred energy sources. The different sources, such as photovoltaic cells, fuel cells, and batteries, generally have different voltage and current characteristics. In some cases, one source is preferential to others; in other cases, a simultaneous combination of sources is appropriate for energy or resource use. Typically, each different source requires a different power converter.

Multiple-input power converters are required to enable multiple-source technology. With multiple inputs, the energy source is diversified to increase reliability and use of renewable sources. Many renewable sources have direct-current ("dc") voltage and current characteristics, so multiple dc-dc conversion is of practical use.

SUMMARY OF THE INVENTION

Apparatuses and methods for multiple-input power conversion are presented. The invention presented is directly applicable to dc-dc systems and has a minimal parts count. One embodiment of the invention is an apparatus for converting a plurality of dc input voltages from a plurality of voltage sources to at least one dc output voltage. The apparatus includes a plurality of voltage inputs. A respective current-conducting-bidirectional-voltage-blocking switch is in an electrical path from each of the voltage inputs. A magnetically inductive device in is an electrical path from each of the current-conducting-bidirectional-voltage-blocking switches. A voltage output is in an electrical path from the magnetically inductive device.

DETAILED DESCRIPTION

The present invention presents apparatuses and methods for converting more than one dc power inputs into one or more dc power outputs with a single power converter. This multiple-input dc power conversion capability offers the capability to power one or more electrical loads with more than one electrical energy source for improved reliability, flexibility, and use of preferred energy sources, such as photovoltaic cells, fuel cells, supercapacitors, and batteries. Embodiments of the invention accommodate continuous and discontinuous conduction modes, either of which may be appropriate under different circumstances.

Figure 1A:
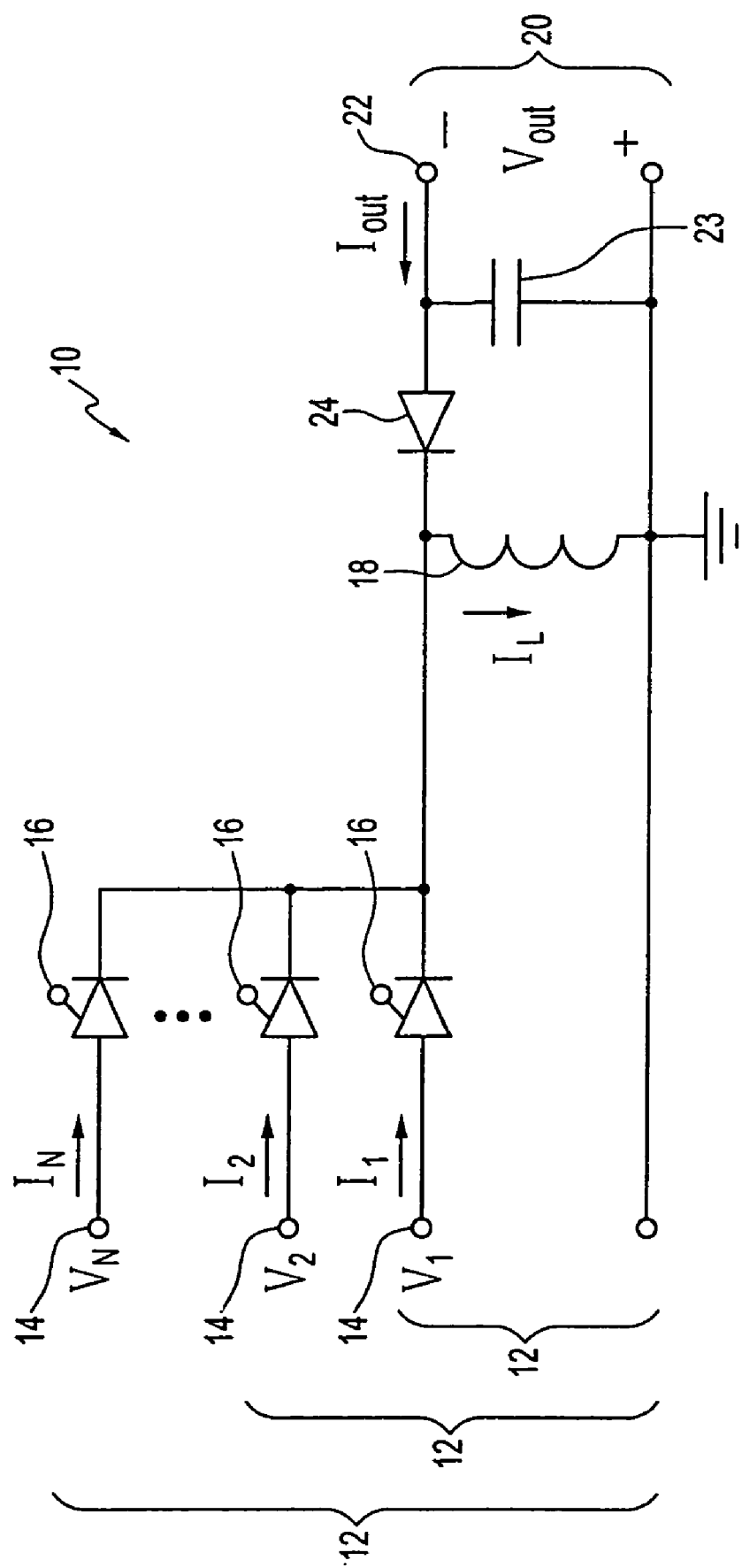
FIG. 1A is a circuit diagram of an exemplary embodiment of the invention.

An apparatus embodiment, a multiple-input buck-boost ("MIBB") converter 10, is shown in FIG. 1A. A buck-boost converter may decrease ("buck") or increase ("boost") an output voltage relative to an input voltage. There are N voltage inputs 12, labeled $V_1, V_2, \ldots V_N$, and N current inputs 14, labeled $I_1, I_2, \ldots I_N$. Each of the voltage inputs 12 and the current inputs 14 are interfaced through a forward-conducting-bidirectional-blocking ("FCBB") switch 16. The FCBB 16 is a device that can conduct current in only one direction, but it can block a voltage in either direction. In an embodiment of the invention, the FCBB switch 16 may be a gate turn-off ("GTO") thyristor. In other embodiments, the FCBB switch 16 may be a MOS-controlled thyristor, a silicon-controlled thyristor, a series MOSFET and diode pair, a bipolar junction transistor and diode pair, an insulated gate bipolar transistor and diode pair, or other semiconductor based device, but implementation is of the FCBB 16 is not necessarily limited to the mentioned implementations. In other embodiments, other switch combinations may be used to realize the FCBB switch 16. The voltage inputs 12 and the current inputs 14 share a common inductor 18 with an inductance of L. The MIBB converter 10 has a voltage output 20, labeled $V_{out}$, and a current output 22, labeled $I_{out}$, and has an output capacitor 23 with a value of C. The voltage output 20, the current output 22, and the output capacitance 23 are interfaced to the inductor 18 through a diode 24.

Figure 1B:
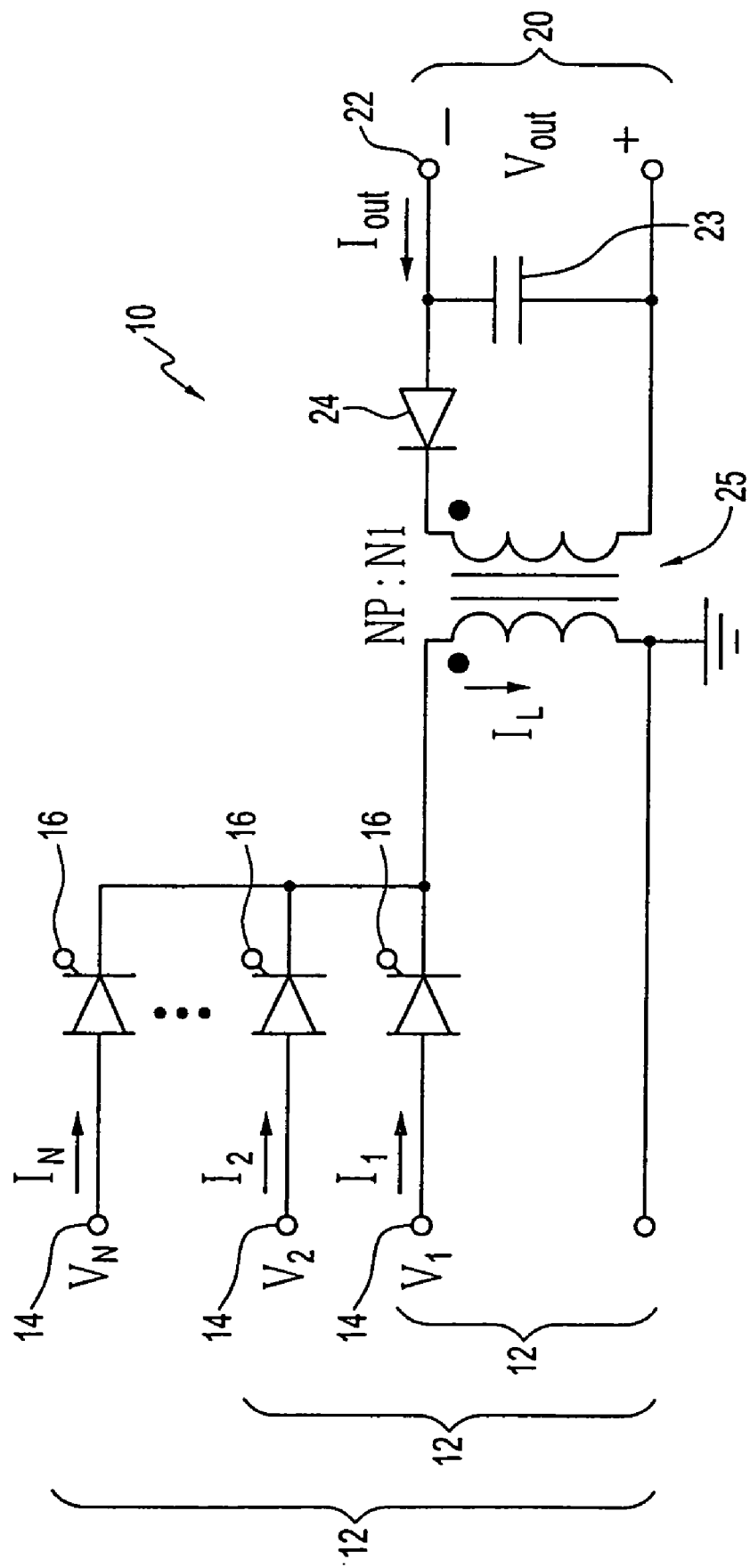
FIG. 1B is a circuit diagram of an exemplary embodiment of the invention.

The inductor 18 is one example of a magnetically inductive device used in embodiments of the invention. FIG. 1B shows an embodiment of the invention, MIBB converter 10, with a transformer 25, which is another example of a magnetically inductive device used in embodiment of the present invention, substituted for the inductor 18. This embodiment of the invention may be used for isolation, polarity reversal of output relative to input, added bucking or boosting by means of turns ratio, or all of these actions. With a transformer 25 turns ratio of NP/N1, output voltage is a factor of NP/N1 times the input with an inductor 18 in place of the transformer 25.

In this and other transformer circuits shown herein, skilled artisans will appreciate that placement of the ground symbol is arbitrary. Shown on the input side of the transformer 25 herein, the transformer 25 allows one or more of the voltage outputs 20 and current outputs 22 to be grounded, as well.

Figure 1C:
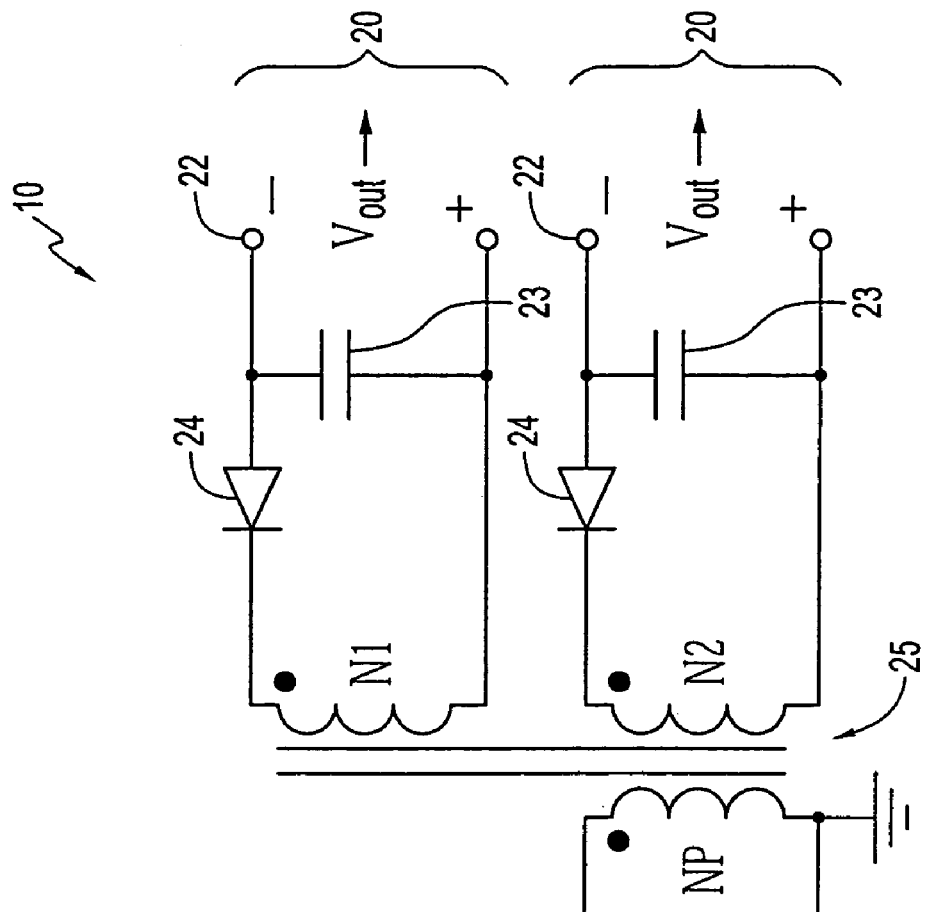
FIG. 1C is a circuit diagram of an exemplary embodiment of the invention.

FIG. 1C shows an embodiment of the invention, MIBB converter 10, with two sets of voltage outputs 20 and current outputs 22, both sets isolated from the array of voltage inputs 12 and current inputs 14 by the transformer 25. In the MIBB converter 10 of FIG. 1C, the outputs are scaled according to the ratios NP/N1 an NP/N2, respectively.

Figure 1D:
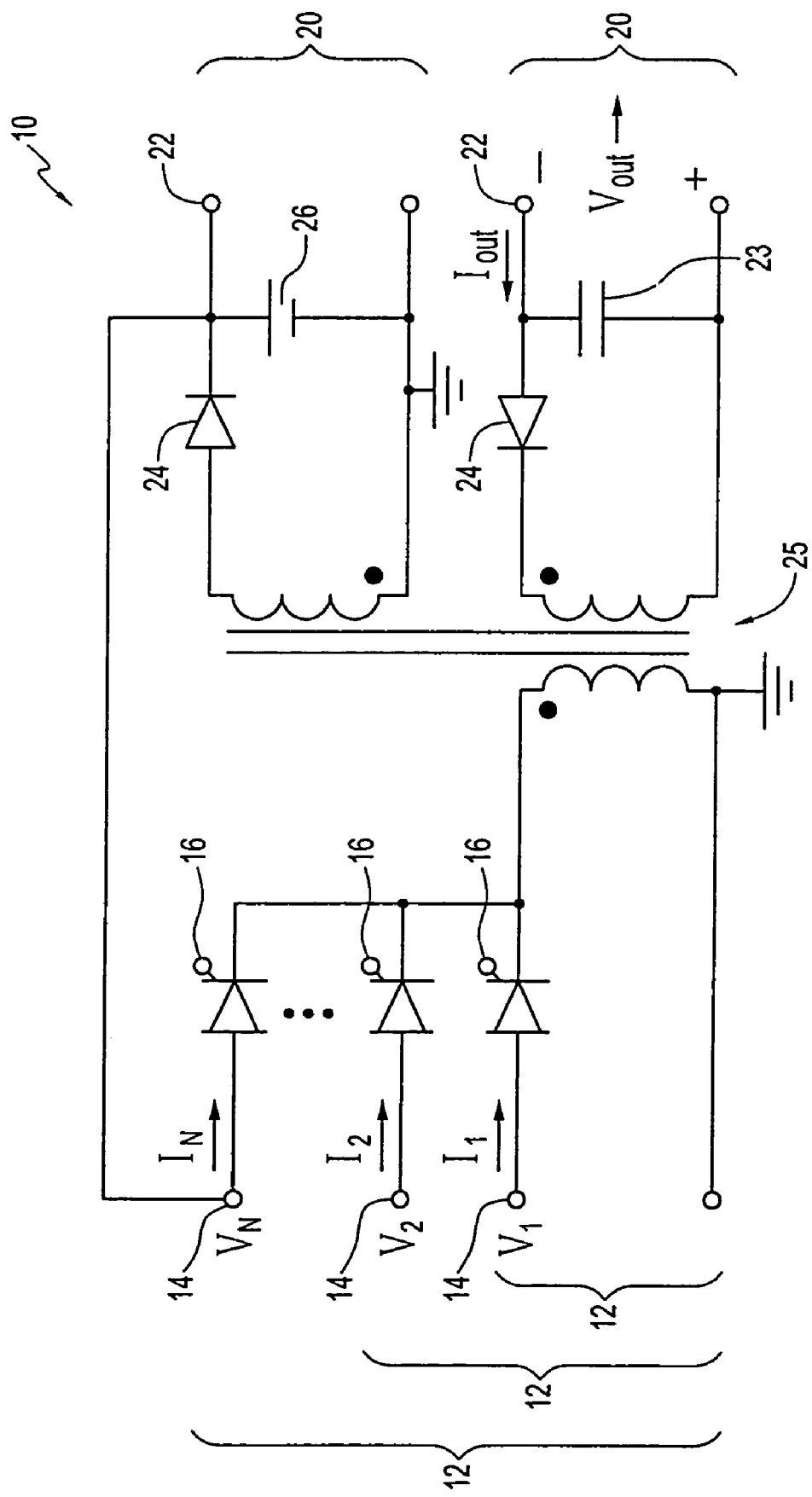
FIG. 1D is a circuit diagram of an exemplary embodiment of the invention.

FIG. 1D shows an embodiment of the invention, MIBB converter 10, with two sets of voltage outputs 20 and current outputs 22, where one such set, equipped with a diode 24 oriented in the circuit in the opposite sense relative to its orientation in FIG. 1C, is used for charging a battery 26. The battery 26 may be used as a source in this embodiment by coupling it to one of the inputs of the MIBB converter 10, as shown.

Figure 1E:
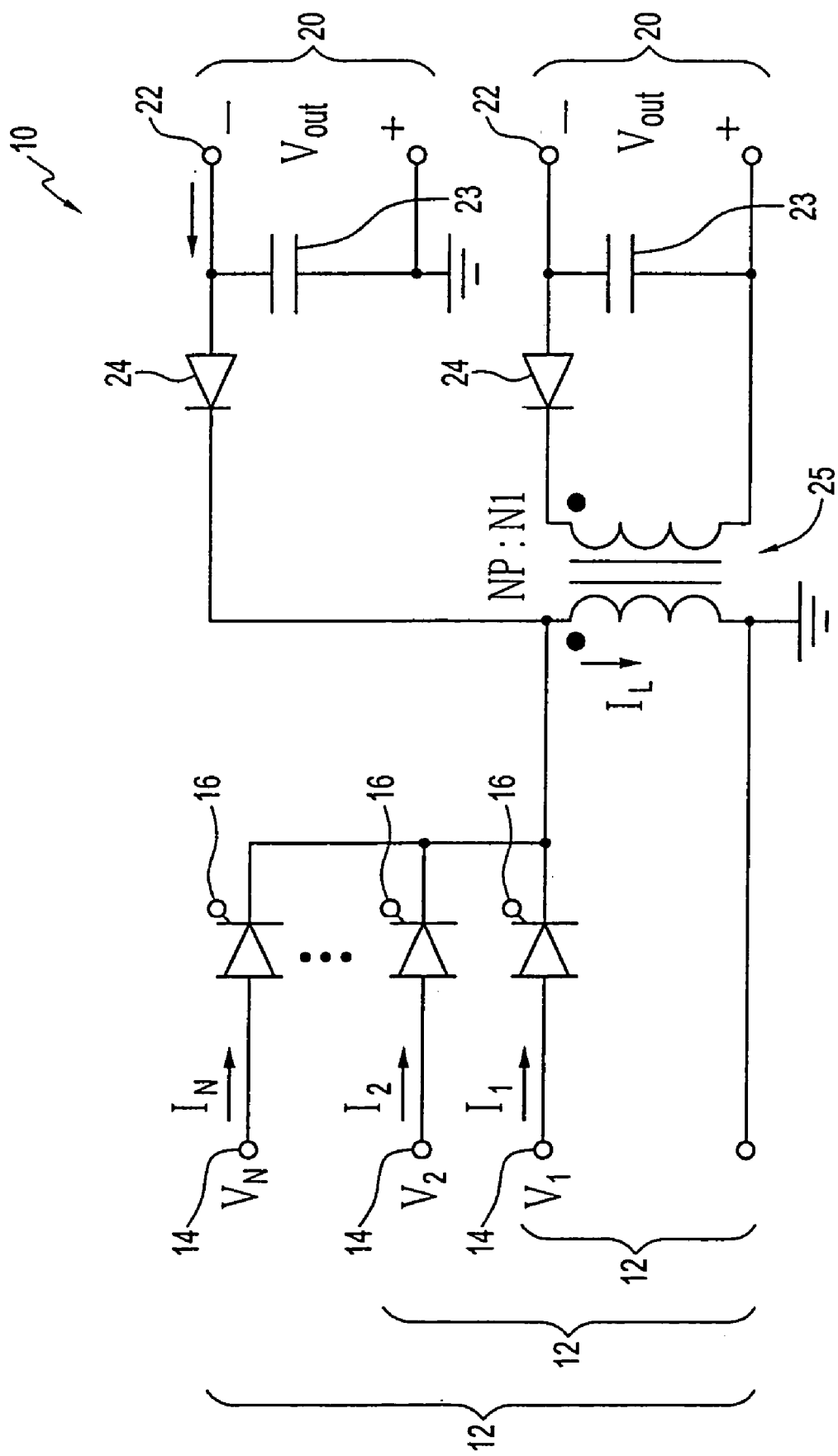
FIG. 1E is a circuit diagram of an exemplary embodiment of the invention.

An embodiment of the invention, an MIBB converter 10, combining an inductor circuit and a transformer circuit is shown in FIG. 1E. Output 1 is taken directly off the primary of the transformer 25, the primary being like an inductor, and output 2 is taken off the secondary of the transformer 25. This embodiment may be useful in circumstances in which the advantages of use of the transformer 25 are not required for one or more of the inputs.

Figure 1F:
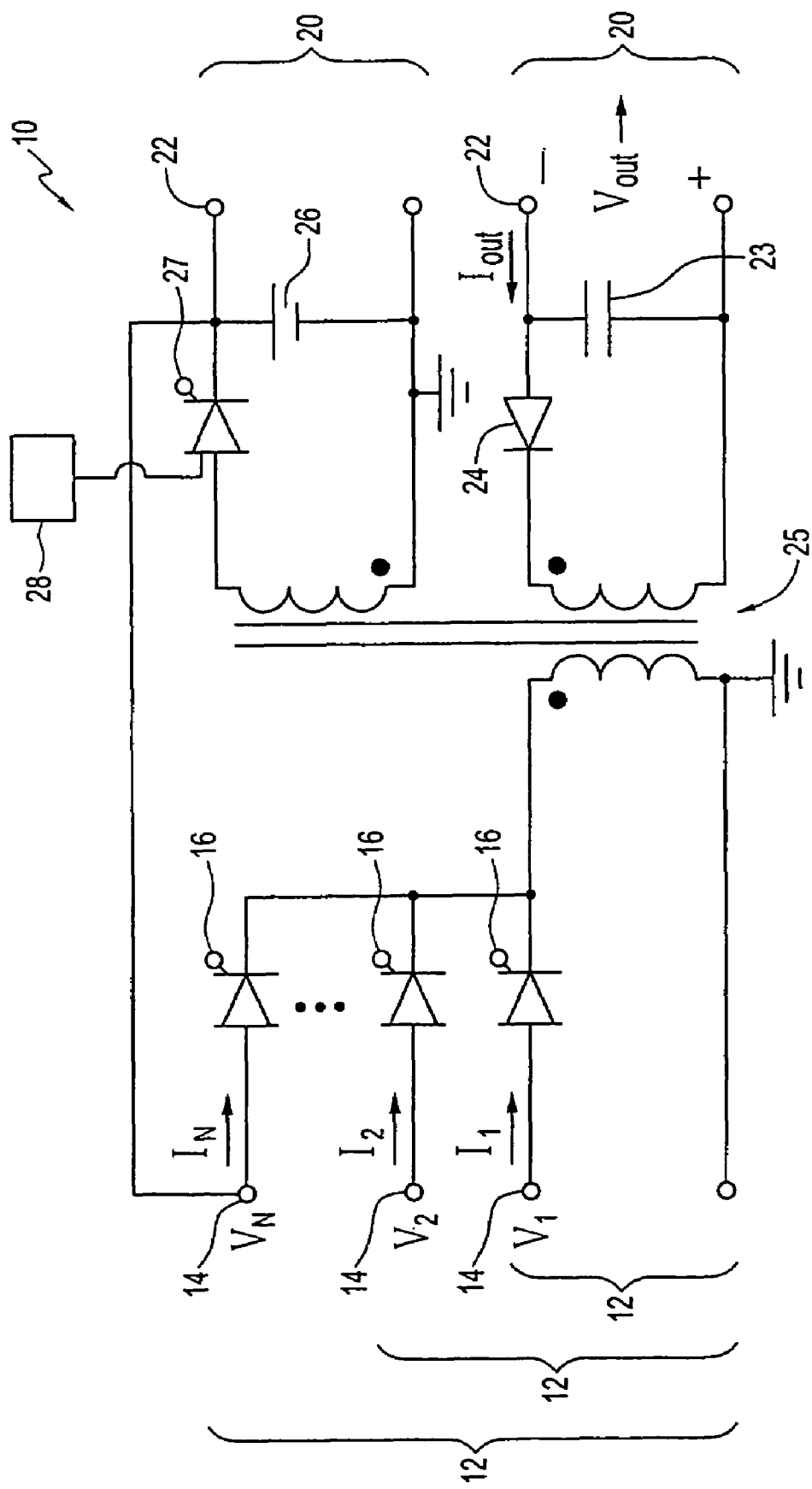
FIG. 1F is a circuit diagram of an exemplary embodiment of the invention.

In FIG. 1F, an embodiment of the invention, MIBB converter 10, derived from the MIBB converter 10 of FIG. 1C is shown. This embodiment allows for bidirectional power flow. In the MIBB converter 10 of FIG. 1D, the FCBB switch 27 replaces a diode 24 on the output side of the MIBB converter 10 of FIG. 1C. In the embodiment of the invention depicted in FIG. 1F, the FCBB switch 27 may be used as a pure substitute for the diode 24 to provide a bidirectional output that may serve as a source, e.g., a rechargeable battery 26. The FCBB switch 27 may be switched on when charging a battery 26, i.e., when a battery 26 is coupled as an output load to the MIBB converter 10 at the bidirectional output (although the FCBB switch 27 must be forced to turn on, whereas the diode 24 turns on automatically). The FCBB switch 27 may be turned off when the battery 26 is used as a source, i.e., when the battery 26 is coupled as an input device. For the purpose of switching the FCBB switch 27 on, the bidirectional control circuitry 28, including, e.g., a silicon-controlled rectifier, may be used.

Skilled artisans will appreciate that all embodiments of the invention including a transformer 25 may be generalized to n outputs by adding the appropriate number of secondary transformer windings with a diode and a capacitor.

Figure 2:
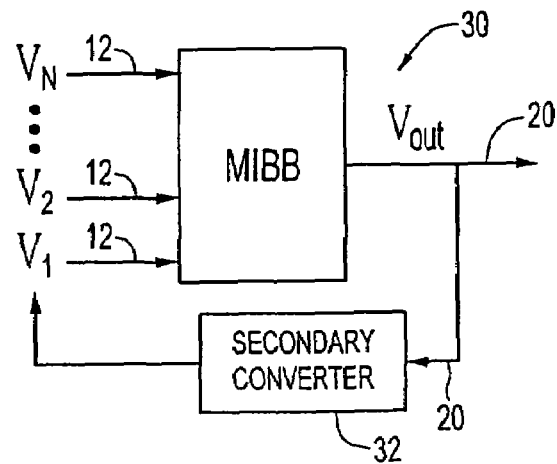
FIG. 2 is a schematic diagram of an exemplary embodiment of the invention.
Figure 3:
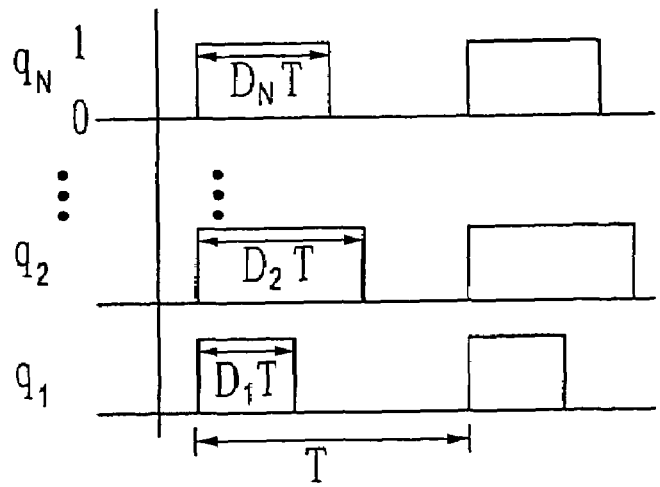
FIG. 3 is a plot showing a duty cycle scheme for an embodiment of the invention.

The MIBB converters 10 shown in FIGS. 1A–1E allow for unidirectional power flow only, which is generally sufficient for sources such as primary batteries, solar cells, and fuel cells. Some applications, however, require bidirectional power flow. One embodiment allowing bidirectional power flow is shown if FIG. 1F, described above. Another embodiment allowing bidirectional power flow, the bidirectional MIBB converter 30, is shown in FIG. 2. In the bidirectional MIBB converter 30, the voltage output 20 serves as the input to a secondary converter 32 that is included in the bidirectional MIBB converter 30. The secondary converter 32 uses one of the voltage inputs 12 as an output. Generally, the voltage output 20 may or may not be a regulated voltage, because it may or may not be the final output of the bidirectional MIBB converter 30. The voltage output 20 may feed other converters that are tightly regulated to different voltages, or it may be fed back to one of the voltage inputs 12, as shown in FIG. 2. When the output voltage 20 is fed back to one of the voltage inputs 12, the bidirectional MIBB converter 30 is realized.

As shown in FIGS. 1A–1F and 2, the converters 10 and 26 have negatively referenced outputs. This is only by the convention used here, but skilled artisans will recognize that this can be reversed. Many of the possible sources used, such as batteries, solar cells, and fuel cells, have naturally floating inputs that will allow reversal of the their terminals with respect to the traditional ground convention. An advantage of this scheme is that the magnetically inductive device, an inductor 18 or a transformer 25, is shared by all the inputs. In some converter control schemes, one may wish to determine the current coming into each input. This can be done by decoding of the switch signals and sensing the current through the magnetically inductive device and decomposing the current through the magnetically inductive device based upon a switching state resulting from the selective blocking of up to all of the plurality of voltage input sources. A switching state may be obtained by decoding the switch signals. Thus, all the input currents can be monitored with only a single sensor. Another advantage is that with the switching strategy proposed below, all but one of the active switches turn on with zero current.

In embodiments of the invention, the FCBB switch 16 may be replaced by a bidirectional-conducting-bidirectional-blocking ("BCBB") switch. A BCBB switch may include two FCBB switches coupled anti-parallel to each other.

As noted above, embodiments of the invention accommodate continuous and discontinuous conduction modes, either of which may be appropriate under different circumstances.

If the inductor 18 current, $I_L$, is greater than zero in the steady-state, continuous conduction mode results. This guarantees that at least one FCBB switch 16 or the diode 24 is conducting at all times. In the steady state, the average inductor 18 voltage is zero. It may be assumed that the output capacitor is sufficiently large as to make the output voltage almost constant, without limiting the scope of the invention in any way. If any active FCBB switch 16 is on, the diode is off, but if all of the FCBB switches 16 are off, then the diode is on and the inductor 18 voltage is $-V_{out}$. If several active FCBB switches 16 are on, then the inductor 18 voltage is equal to the highest of the voltages for which the respective FCBB switch 16 is on. Labeling the binary (0 or 1 value) switching signals $q_i$, $$v_L = \max_i(q_i V_i) - V_o \prod_i \bar{q}_i \qquad (0.1)$$

Setting the average of (0.1) to zero and solving, $$V_o = \frac{\int_0^T \max_i(q_i V_i) dt}{\int_0^T \prod_i \bar{q}_i dt} \qquad (0.2)$$

In one duty cycle control scheme for an embodiment of the invention, each FCBB switch 16 switches at the same frequency and the leading edges of the switch signals, $q_i$, coincide. This duty cycle control scheme is shown in FIG.

3. The trailing edges do not coincide, as each FCBB switch 16 has a different duty cycle, $D_i$. Then (0.2) simplifies to $$V_o = \frac{\sum_i D_{eff(i)} V_i}{1 - \max_i(D_i)} \quad (0.3)$$

where $D_{eff(i)}$ is the effective duty cycle of each FCBB switch 16; that is, the portion of time the FCBB switch 16 conducts nonzero current. If the voltage indices are arbitrarily ordered such that $V_1 > V_2 > \ldots > V_N$, then $$D_{eff(i)} = \begin{cases} 0, & D_i < \sum_{j=1}^{i-1} D_{eff(j)} \\ D_i - \sum_{j=1}^{i-1} D_{eff(j)}, & D_i \geq \sum_{j=1}^{i-1} D_{eff(j)} \end{cases} \quad (0.4)$$

For example, a two-input converter, there are only two possibilities: if $D_1 > D_2$, then $$V_o = \frac{D_1}{1 - D_1} V_1 \quad (0.5)$$

or if $D_2 > D_1$, then $$V_o = \frac{D_1 V_1 + (D_2 - D_1) V_2}{1 - D_2} \quad (0.6)$$

In general, the number of possible combinations of duty cycle relationships, and therefore the number of different forms of the output voltage equation, is $K_N = NK_{N-1}$, where $K_1 = 1$. Equation (0.5) is that of a normal buck-boost converter—the lower voltage source, $V_2$ does not enter in. Equation (0.6) is the form that allows simultaneous contribution from both sources. If contribution only from source 2 is desired, then $D_1$ may be set to $D_1 = 0$, resulting in a standard buck-boost from source 2. If the input voltages change such that source 2 exceed source 1, the sources may simply be renumbered to accommodate the equations.

The average inductor current, by Kirchhoff's Current Law, is $$I_L = \frac{I_{out}}{1 - \sum_j D_{eff(j)}} \quad (0.7)$$

and the peak-to-peak inductor current ripple is $$|\Delta i_L| = \frac{V_{out}}{L} \left[ 1 - \max_i(D_i) \right] T \quad (0.8)$$

when approximating the inductor time constant as long compared to the period, T. The output voltage ripple is approximated with the same assumption as:

$$|\Delta v_C| = \frac{I_{out}}{C} \left[ \max_i(D_i) \right] T \quad (0.9)$$

Discontinuous conduction mode is important to consider due to the possible advantages of a small inductor 18 voltage and higher output voltage. In the case of the MIBB, there is to be a lot of versatility in the input sources. It may be an unreasonable constraint to impose a minimum inductor 18 current (in order to assure continuity) when trying to optimize the contributions from all sources connected. Therefore, discontinuous mode may be an essential aspect of multiple-input converter control.

Figure 4:
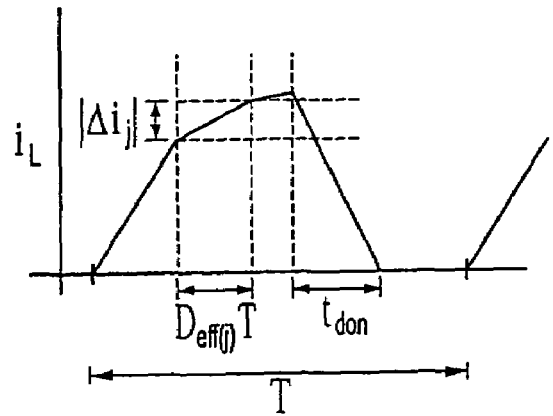
FIG. 4 is a plot showing current change versus time for an embodiment of the invention.

In discontinuous conduction mode, only one FCBB switch 16 conducts at a time. Assuming the time constant of the inductor 18 is slow compared to the time a given FCBB switch 16 is on, $$|\Delta i_j| = \frac{V_j}{L} D_{eff(j)} T \quad (0.10)$$

where T is the period. The total change in current in the positive direction is the sum of all. The current change versus time is shown in FIG. 4. Since in discontinuous conduction mode, the current starts from zero each cycle, $$i_p = \sum_j |\Delta i_j| = \frac{T}{L} \sum_j D_{eff(j)} V_j \quad (0.11)$$

Once all FCBB switches 16 are switched off, the diode conducts until its current (the inductor current) returns to zero. Again, assuming a time constant relatively large compared to the period, $$t_{don} = \frac{i_p L}{V_{out}} \quad (0.12)$$

is the time it takes for the inductor to completely discharge and the time the diode is on each cycle. The time the diode is off each cycle is then $T - t_{don} = t_{doff}$.

The voltage ripple on the capacitor 23 can be calculated by assuming a discharge that is slow compared to the switching period. The discharge occurs while the diode is off, so $$|\Delta v_{out}| = \frac{I_{out}}{C} t_{doff} \quad (0.13)$$

The inductor energy stored in the inductor 18 at the instant the diode turns on is $0.5 L i_p^2$. All of this energy passes to the load coupled to the voltage output 20 and the capacitor 23. The capacitor 23 voltage increases by $|\Delta v_{out}|$ from $0.5 C (V_{out} - \Delta v/2)^2$ to $0.5 C (V_{out} + \Delta v/2)^2$ in the time $t_{don}$, for a net energy change of $C V_{out} \Delta v$. The energy passing to the load during the inductor discharge is $V_{out} I_{out} t_{don}$. This yields the energy balance $$\frac{1}{2} L i_p^2 = C V_{out} \Delta v + V_{out} I_{out} t_{don} \quad (0.14)$$

Substituting (0.13) and (0.14), assuming a resistive load, R, and solving for $V_{out}$, $$V_{out} = i_p \sqrt{\frac{RL}{2T}} \quad (0.15)$$

Equation (0.15) demonstrates sensitivity to parameters, as we expect for discontinuous conduction mode in general for dc-dc converters. For embodiments of the invention employing discontinuous conduction mode, it will usually be necessary to employ feedback control if a specific output voltage is required.

Figure 5:
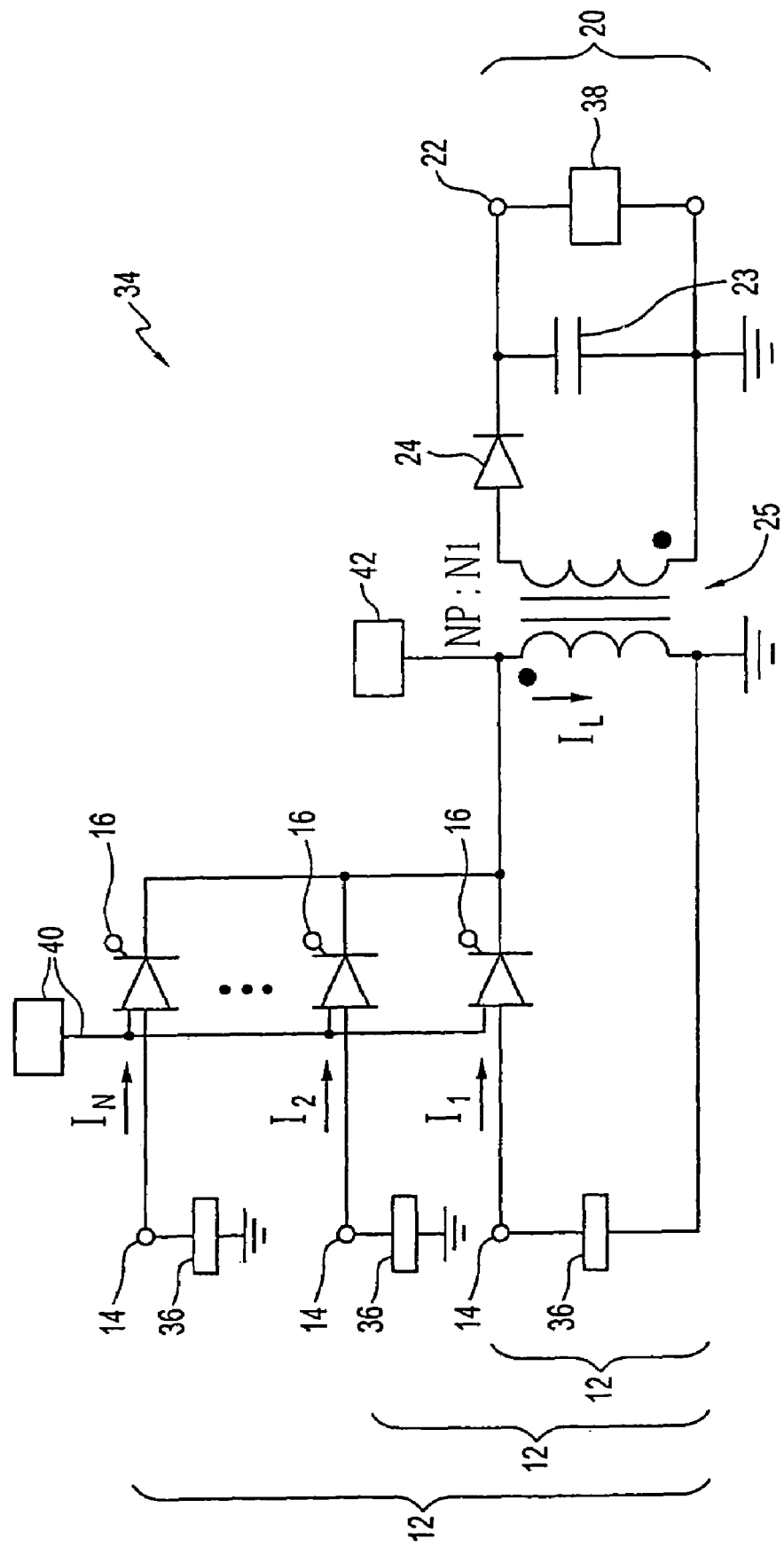
FIG. 5 is a circuit diagram of an exemplary embodiment of the invention.

FIG. 5 depicts a system embodiment of the claimed invention. In the system 34 shown, N voltage sources 36 are connected to voltage inputs 12, and a load 38 is connected to voltage output 20. The voltage sources 36 may be different types of sources coupled to the converter 10 at the same time, such as photovoltaic cells, fuel cells, and batteries, or they may be of the same type, such as a group of batteries, which may be rechargeable, as in a battery pack. In the system embodiment illustrated in FIG. 5, a transformer 25 with a single secondary winding is depicted as an exemplary magnetically inductive device without limiting the scope of the invention. Input control circuitry 40 for switching the forward-conducting-bidirectional-blocking switches 16 is included. In an embodiment of the invention, the input control circuitry 40 controls switching of the forward-conducting bidirectional-blocking switches 16. In one embodiment of the invention, the input control circuitry 40 switches on the forward-conducting bidirectional-blocking switches 16 with a switch signal, and each of the forward-conducting bidirectional-blocking switches 16. A current sensor 42 is shown connected to the primary winding of exemplary magnetically inductive device transformer 25. If the magnetically inductive device in system 34 is an inductor 18 or another such device, the current sensor 42 is connected to sense the current through inductor 18 or the corresponding device.

Figure 6:
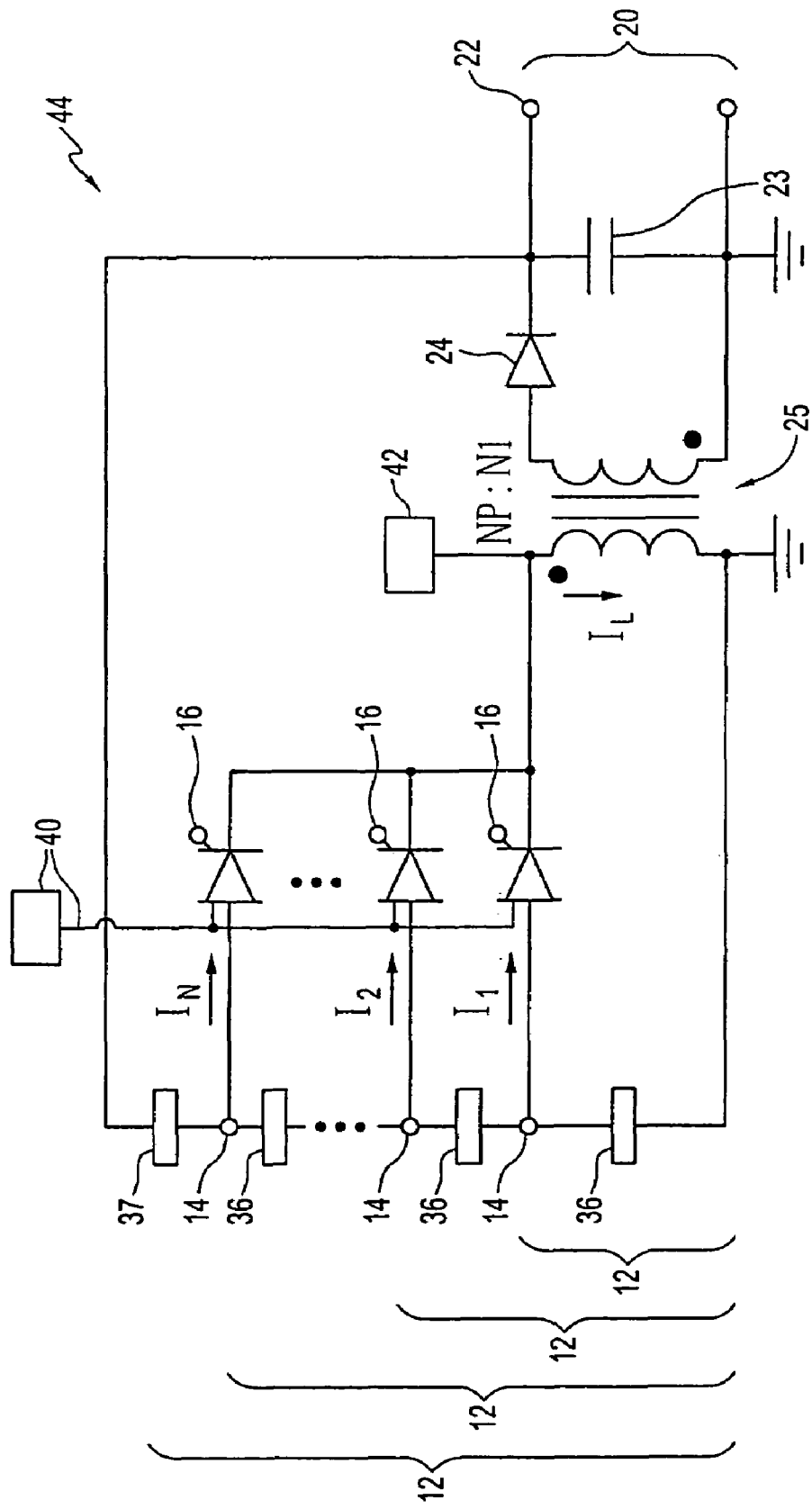
FIG. 6 is a circuit diagram of an exemplary embodiment of the invention.

FIG. 6 shows an exemplary system 44 that includes a set of rechargeable batteries, e.g., a battery pack, as voltage sources 36, and a load 38 connected to voltage output 20. The exemplary system 44 may be used to take charge from a particular one of voltage sources 36 (where that one voltage source 36 may be overcharged relative to the other voltage sources 36) in the form of current, and to redistribute it to the other voltage sources 36. The current from the particular voltage source 36 flows through the magnetically inductive device (here depicted as a transformer 25 with a single secondary winding without limiting the scope of the invention) to the current output 22, which is connected back to the current inputs 14 to place the charge taken from the particular voltage source 36 to the other voltage source 36. Thus, the exemplary system 44 may be used to allow current to be drawn from each voltage source 36 in the pack to substantially equalize the charge level of the batteries to lengthen the life of the rechargeable batteries.

In an embodiment of exemplary system 44, the voltage sources are connected together in series as depicted in FIG. 6, with at least one of the voltage sources 36 connected to a current input 14 and to a current output 22. (In FIG. 6, this voltage source 36 is depicted as the uppermost of the voltage sources 36.)

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A buck-boost converter for converting a plurality of dc input voltages from a plurality of voltage sources to at least one dc output voltage, the converter comprising:
   a plurality of voltage inputs;
   a switch in an electrical path from each of said voltage inputs for conducting current from and blocking current to said voltage inputs;
   a magnetically inductive device in an electrical path from each of said switches; and
   a voltage output bucked or boosted relative to one of said voltage inputs in an electrical path from said magnetically inductive device.

2. The converter recited in claim 1, wherein said voltage output comprises one of a plurality of voltage outputs.

3. The converter recited in claim 1, wherein said magnetically inductive device comprises an inductor.

4. The converter recited in claim 1, wherein said magnetically inductive device comprises a transformer.

5. The converter recited in claim 4, wherein said voltage output is reversed in polarity relative to one of said voltage inputs.

6. The converter recited in claim 1 in an electrical path with a secondary converter (32), the apparatus having said voltage output fed back to one of said plurality of said voltage inputs through said secondary converter.

7. The converter recited in claim 1 wherein each of said switches is switched on substantially simultaneously with a switch signal;
   each of said switches has a different duty cycle;
   a voltage index i is assigned to each voltage source connected to a voltage input of plurality of said voltage inputs such that $V_1 > V_2 > \ldots V_n$; and
   each of said switches has an effective duty cycle $D_{eff(i)}$ of $$D_{eff(i)} = \begin{cases} 0, & D_i < \sum_{j=1}^{i-1} D_{eff(j)} \\ D_i - \sum_{j=1}^{i-1} D_{eff(j)}, & D_i \geq \sum_{j=1}^{i-1} D_{eff(j)} \end{cases}$$

such that a voltage at the voltage output $V_o$ $$V_o = \frac{\sum_i D_{eff(i)} V_i}{1 - \max_i(D_i)}.$$

8. The converter recited in claim 7, further comprising:
   an input control circuitry in an electrical path to each of said respective switches for controlling switching of said switches.

9. The converter of claim 1 wherein
   a current through said magnetically inductive device, said magnetically inductive device having an inductance L, is greater than zero in steady state operation;

each of said switches is switched on and off with a binary switching signal having a value of 1 or 0;

said voltage output is connected to a resistive load R;

only one of each of said switches is switched on in any given period of time T, such that a current in the magnetically inductive device $i_p$, is $$i_p = \sum_j |\Delta i_j| = \frac{T}{L}\sum_j D_{\text{eff}(j)} V_j,$$

and a voltage at the voltage output $V_{out}$ is $$V_{out} = i_p \sqrt{\frac{RL}{2T}}.$$

10. The converter recited in claim 9, further comprising:
input control circuitry in an electrical path to each of said switches for controlling switching of said current switches.

11. The converter recited in claim 1, wherein said switch comprises a forward-conducting-bidirectional-blocking switch.

12. A buck-boost converter for providing dc power from more than one source to at least one load, comprising:
a magnetically inductive device;
a plurality of inputs for respective sources in parallel through respective switches for conducting current from and blocking current to said inputs, to said magnetically inductive device; and
at least one output bucked or boosted relative to one of said inputs for at least one load in parallel with a capacitor, said capacitor being in series with a diode connected to said magnetically inductive device.

13. The converter recited in claim 12, further comprising:
input control circuitry in electrical paths to said respective switches for switching said switches to open and close said electrical paths from said inputs to said magnetically inductive device.

14. The converter recited in claim 13 wherein said input control circuitry closes at most only one of said switches at a given time.

15. The converter recited in claim 13 wherein said input control circuitry closes up to all of said switches at a given time.

16. The converter recited in claim 12 wherein said magnetically inductive device comprises a transformer including at least one primary winding and at least one secondary winding; and
the converter further comprises at least one bidirectional output in an electrical path in parallel through an additional current-conducting-bidirectional-voltage-blocking switch from said at least one secondary winding of said magnetically inductive device, and in an electrical path to an input of said plurality of inputs; and
bidirectional control circuitry for switching said additional current-conducting-bidirectional-voltage-blocking switch.

17. The converter recited in claim 16 wherein said load that may serve as a source comprises a rechargeable battery.

18. The converter recited in claim 12 wherein said magnetically inductive device comprises a transformer including at least one primary winding and at least one secondary winding.

19. The converter recited in claim 12 wherein said transformer includes a plurality of secondary windings and said at least one output includes respective outputs in electrical paths to each of said plurality of secondary windings.

20. The converter recited in claim 12 wherein at least one output includes at least one output in an electrical path to a primary winding of said at least one primary winding and at least one output in an electrical path to said at least one secondary winding.

21. The converter recited in claim 12, wherein said current-conducting-bidirectional-voltage-blocking switch comprises a forward-conducting -bidirectional-blocking switch.

22. The converter recited in claim 12, wherein said current-conducting-bidirectional-voltage-blocking switch comprises a bidirectional-conducting -bidirectional-blocking switch.

23. A buck-boost system for supplying power to a load from a plurality of sources, the system comprising:
a plurality of sources;
a respective voltage input in an electrical path from each of said plurality of sources;
a switch in an electrical path from each of said voltage inputs for conducting current front and blocking current to said voltage inputs;
input control circuitry in an electrical path to each of said switches for controlling switching of said switches;
a magnetically inductive device in an electrical path from each of said current-conducting-bidirectional-voltage-blocking switches; and
a voltage output bucked or boosted relative to one of said voltage inputs in an electrical path from said magnetically inductive device.

24. The system recited in claim 23, wherein said switch comprises a forward-conducting-bidirectional-blocking switch.

25. A buck-boost for substantially equalizing the charges of a plurality of rechargeable voltage sources, the system comprising:
a plurality of rechargeable voltage sources arranged serially in an electrical path;
respective voltage inputs in respective electrical paths to all excepting at least one of said rechargeable voltage sources;
respective current-conducting-bidirectional-voltage-blocking switches in respective electrical paths to said all excepting at least one of said plurality of rechargeable voltage sources;
a magnetically inductive device in an electrical path with said current-conducting-bidirectional-voltage blocking switches;
an output comprising a voltage output and a current output, said voltage output being bucked or boosted relative to one of said voltage inputs and in parallel with a capacitor in series with a diode to said magnetically inductive device;
wherein said current output is fed back to a rechargeable voltage source that is not comprised in said all excepting at least one of said rechargeable voltage sources.

26. The system recited in claim 25 further comprising:
a load in an electrical path to said output.

27. A method for selectively connecting a plurality of voltage input sources that are in an electrical connection to a magnetically inductive device, the magnetically inductive device being in an electrical path to at least one load, the method comprising:

inserting a switch in the electrical path from each of the voltage input sources for conducting current from and blocking current to the voltage input sources; and applying a control signal to select one or more of said switches to allow current to flow through said selected one or more switches to the magnetically inductive device from the plurality of voltage input sources corresponding to the selected one or more switches.

28. The method recited in claim 27 further comprising: sensing a current in said magnetically inductive device.

29. The method recited in claim 28 wherein said sensing is performed with only a single sensor.

30. The method recited in claim 28 further comprising: decoding of said signal to obtain a switching state.

31. The method recited in claim 30, further comprising: determining a current coming into each of said voltage input sources.

32. The method recited in claim 31, wherein said determining comprises decomposing said current in said magnetically inductive device based upon said switching state.

33. An apparatus for converting a plurality of dc input voltages from a plurality of voltage sources to at least one dc output voltage, the apparatus comprising:

a plurality of voltage inputs;

a switch in an electrical path from each of said voltage inputs for conducting current from and blocking current to said voltage inputs;

a magnetically inductive device in a common electrical path shared by each of said switches; and a voltage output in an electrical path from said magnetically inductive device.

34. The apparatus as defined in claim 33, wherein said inductive device is downstream of said switches.

* * * * *

UNITED STATES PATENT AND TRADEMARK OFFICE
CERTIFICATE OF CORRECTION

PATENT NO. : 7,227,277 B2  Page 1 of 1
APPLICATION NO. : 10/696772
DATED : June 5, 2007
INVENTOR(S) : Chapman et al.

It is certified that error appears in the above-identified patent and that said Letters Patent is hereby corrected as shown below:

In the Issued Patent:

Column 3, line 56, after "flow is", please delete "shown if" and insert --shown in-- therefor.

Column 4, line 5, please delete "26 have" and insert --30 have-- therefor.

Column 6, line 56, after "from", please delete "$0.5C(V^{out}-$" and insert --$0.5C(V_{out}-$ -- therefor.

Column 10, line 28, after "current", please delete "front" and insert --from-- therefor.

Signed and Sealed this

Thirtieth Day of October, 2007

JON W. DUDAS
*Director of the United States Patent and Trademark Office*